J. L. GLEASON.
CONTINUOUS CONTACT REEL.
APPLICATION FILED OCT. 19, 1917.
1,297,146.
Patented Mar. 11, 1919.
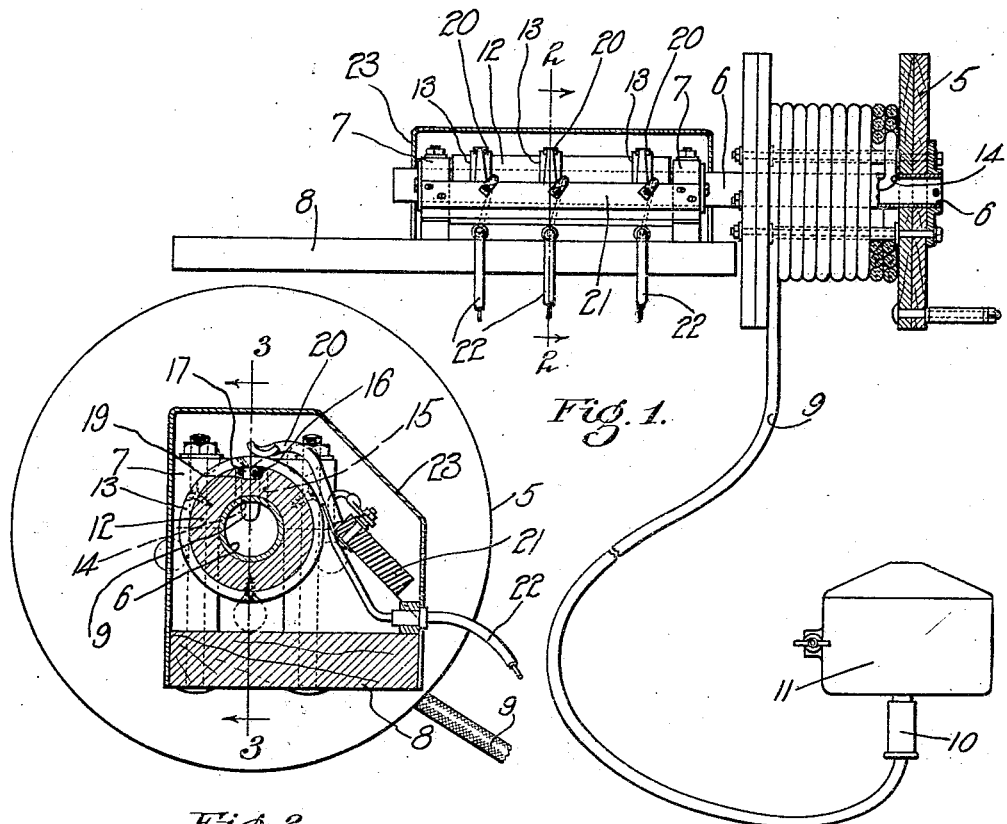
Fig. 1.
Fig. 2.
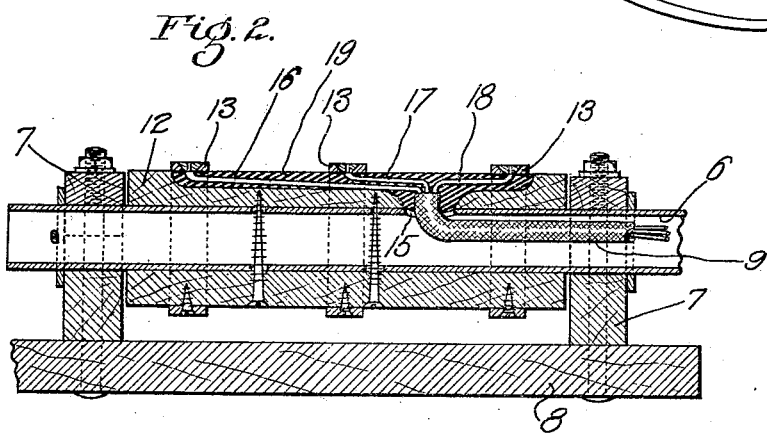
Fig. 3.
Inventor:
John L. Gleason
by his attorney,

UNITED STATES PATENT OFFICE.

JOHN L. GLEASON, OF BOSTON, MASSACHUSETTS.

CONTINUOUS-CONTACT REEL.

1,297,146.   Specification of Letters Patent.   Patented Mar. 11, 1919.

Application filed October 19, 1917. Serial No. 197,490.

*To all whom it may concern:*

Be it known that I, JOHN L. GLEASON, a citizen of the United States, residing at Boston, in the county of Suffolk and State of Massachusetts, have invented new and useful Improvements in Continuous-Contact Reels, of which the following is a specification.

This invention relates to continuous contact reels for portable electrically driven machinery, such as elevating and loading apparatus, hoists, movable saws, pumps, etc., which require considerable lengths of electric wire cable through which they receive their power from the source of electric supply. This type of machinery is continually being moved from one place to another, which causes an ever varying amount of cable to be used to connect it with the supply wire.

The object of this invention is to provide a simple, durable and easily operated device which may be attached to any type of electrically driven machinery in such a manner that the reel, upon which a considerable amount of cable may be wound, may be turned as desired to wind or unwind the cable whenever it is desired to change the position of the machine and at the same time provide a continuous uninterrupted flow of electric current from the source of supply to the electrically operated machine.

To these ends my invention consists in the novel features of construction and in the combination and arrangement of parts set forth in the following specification and particularly pointed out in the claims thereof.

Referring to the drawings:

Figure 1 is a front elevation, partly broken away and shown in section, of a continuous contact reel embodying my invention, together with a receptacle box, at which point the electric cable is connected to the electric supply.

Fig. 2 is an enlarged transverse section taken on the line 2—2 of Fig. 1, illustrating the rotatable sliding contact.

Fig. 3 is a longitudinal section of the insulating drum taken on the line 3—3 of Fig. 2, illustrating the method of attaching the electric wires to the contact rings.

Like numerals refer to like parts throughout the several views of the drawings.

In the drawings, 5 is a reel constructed in any desirable manner, which is fast to a hollow shaft 6 supported in bearing brackets 7 upon a base 8. The base 8 may be attached to any machine which it is desired to operate. A flexible electric cable 9 is wound upon the reel 5, said cable having a free end 10 which is adapted to be connected to the source of electric supply which may be located within a receptacle box 11, stationed at any convenient point.

Fast to the shaft 6, between the bearing brackets 7, is located an insulating drum 12 to which is fastened a plurality of annular contact rings 13. The electric cable 9, which contains the necessary number of wires to conform to the type of motor used or the type of electric current furnished, which, in the embodiment of my invention illustrated is a three phase current, passes inwardly through an aperture 14 to the interior of the hollow shaft 6, thence along the interior of said shaft to a point adjacent to the insulating drum 12, where it passes outwardly, through an aperture 15, and the wires 16, 17 and 18 are each fastened to one of the annular contact rings 13. The end of the electric cable 9, together with the wires 16, 17 and 18, are securely fastened to the drum 12, by means of an insulating material 19.

A plurality of brushes 20, corresponding to the number of annular contact rings 13, are fastened to a base 21 of insulating material supported upon the bearing brackets 7 and the brushes are connected, by flexible electric connections 22, to the terminals of an electrically operated machine previously mentioned. A casing 23 protects the insulating drum and its connecting parts.

The general operation of the device illustrated is as follows:

The portable apparatus to which this device is attached is located as desired and the free end 10 of the electric cable 9 is connected to the source of electric supply at the receptacle box 11. Any slack cable is then taken up by rotating the reel 5 in the proper direction. The apparatus may then be moved as desired, limited only by the length of the electric cable, without breaking the electric current or stopping the machine, the reel being turned as desired and the annular rings 13 always being in contact with the brushes 20.

Having thus specifically described my invention what I claim and desire by Letters Patent to secure is:

1. In combination, a reel, an insulating drum adapted to rotate with said reel, a hollow shaft upon which said reel and said drum are mounted and with which they are adapted to rotate, annular contact rings fast to said insulating drum, a stationary electric supply terminal, an electric cable wound upon said reel, one end of said electric cable being connected to said electric supply terminal and the other end connected through said hollow shaft to said contact rings, brushes engaging said contact rings, and electrical connections from said brushes to an electrically operated member.

2. In combination, a reel, an insulating drum, a hollow shaft forming a common axis for said reel and said insulating drum and rotatable therewith, annular contact rings fast to said insulating drum, an electric cable wound upon said reel, the free end of said electric cable adapted to be connected to a source of electric supply, the other end of said electric cable being permanently connected, through the common axis of said reel and said insulating drum, with said annular contact rings, brushes engaging said contact rings, said brushes being mounted upon a common base of insulating material, and electric connections from said brushes to an electrically operated member.

In testimony whereof I have hereunto set my hand in presence of two subscribing witnesses.

JOHN L. GLEASON.

Witnesses:
 CHARLES S. GOODING,
 SYDNEY E. TAFT.

Copies of this patent may be obtained for five cents each, by addressing the "Commissioner of Patents, Washington, D. C."